Patented Aug. 11, 1936

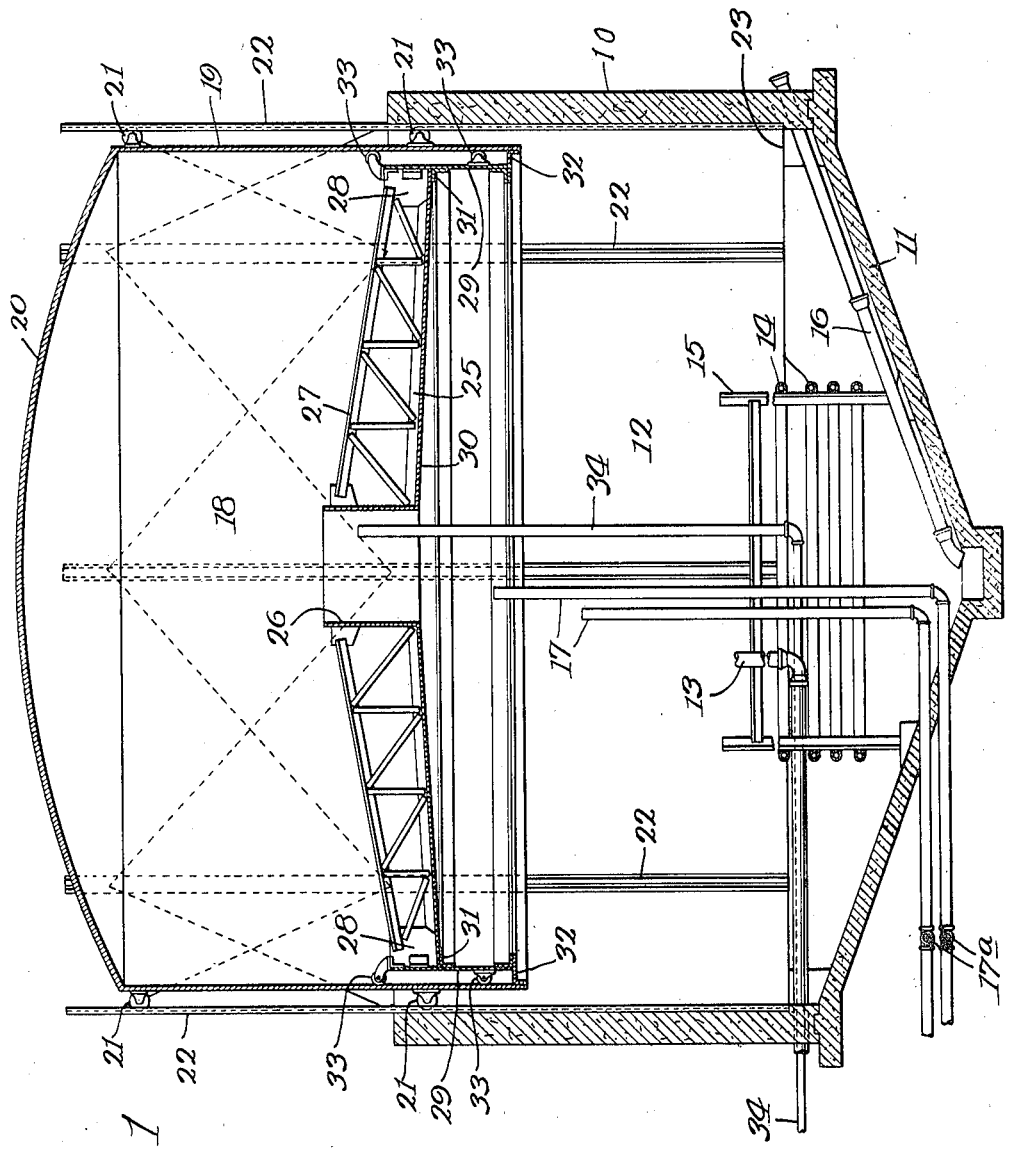

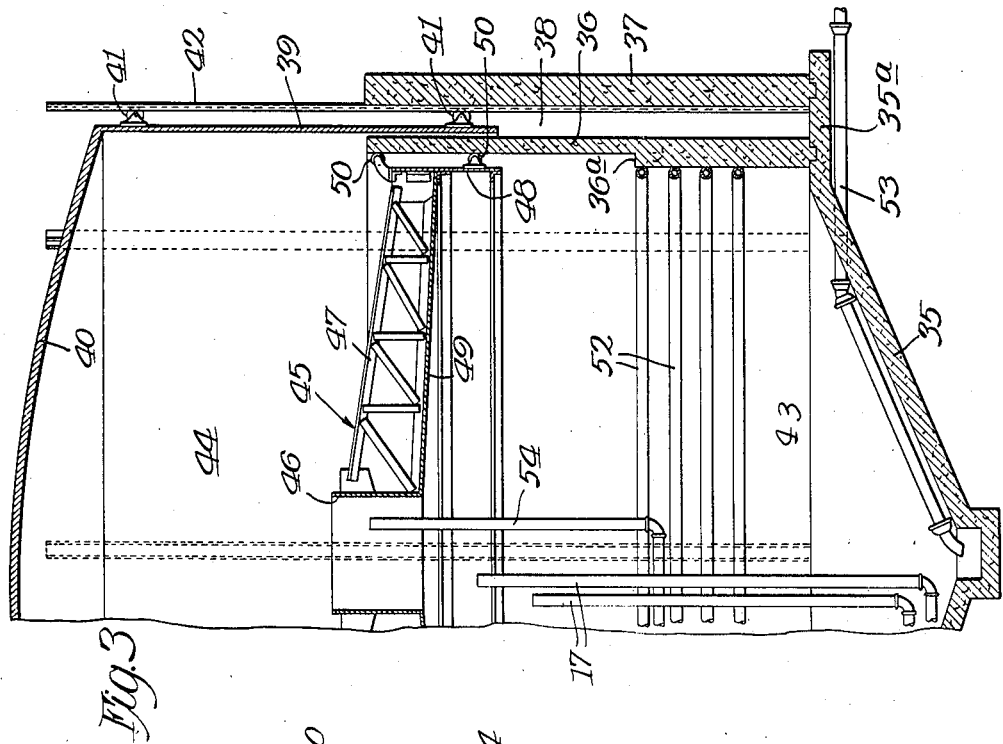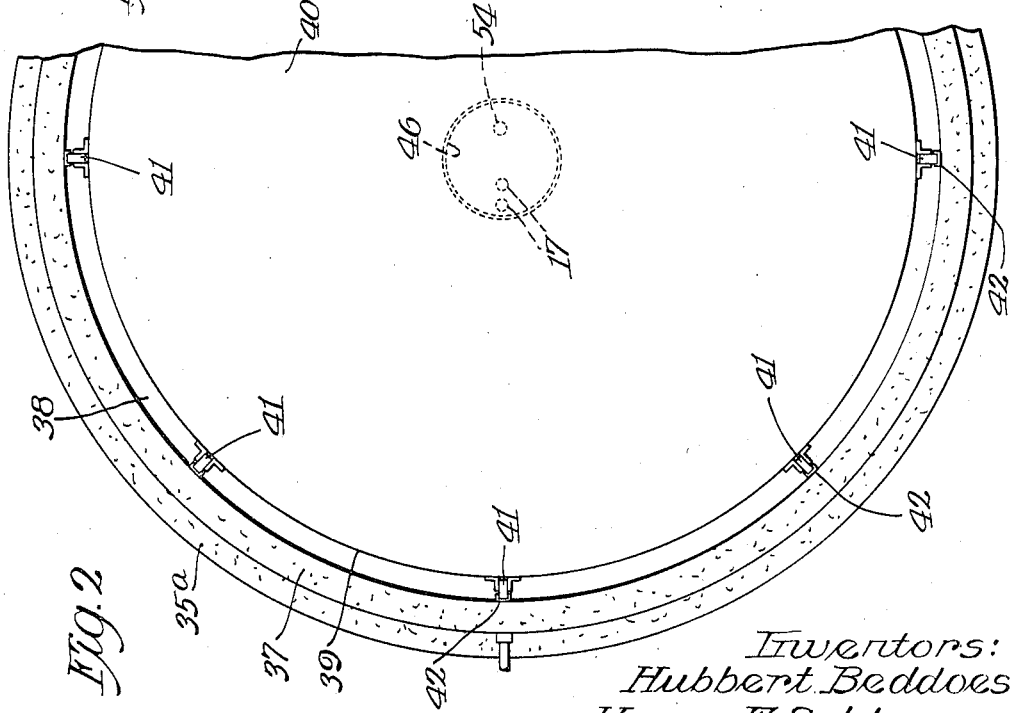

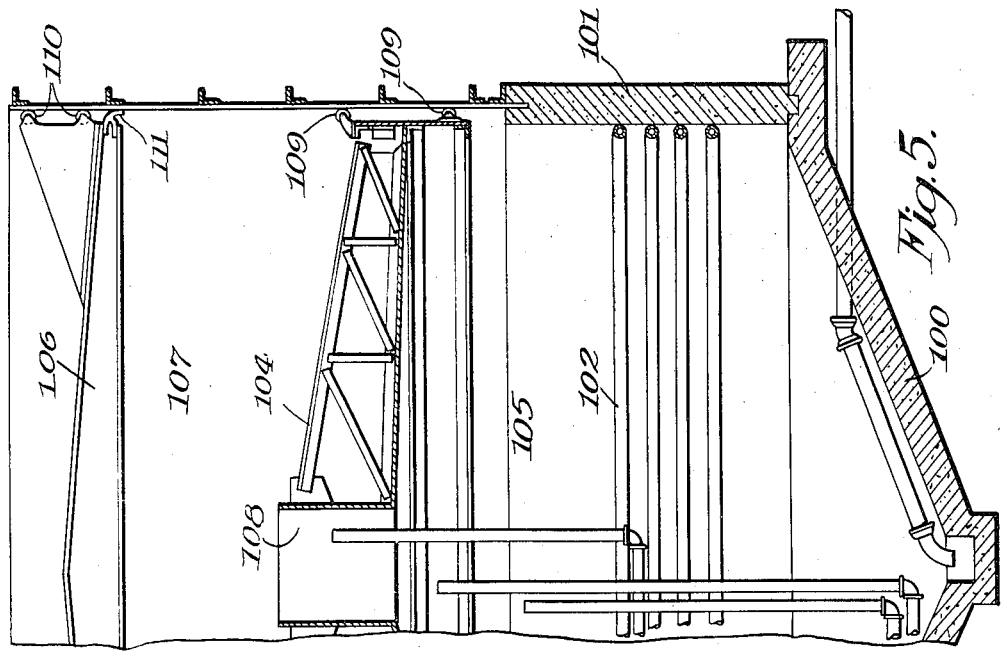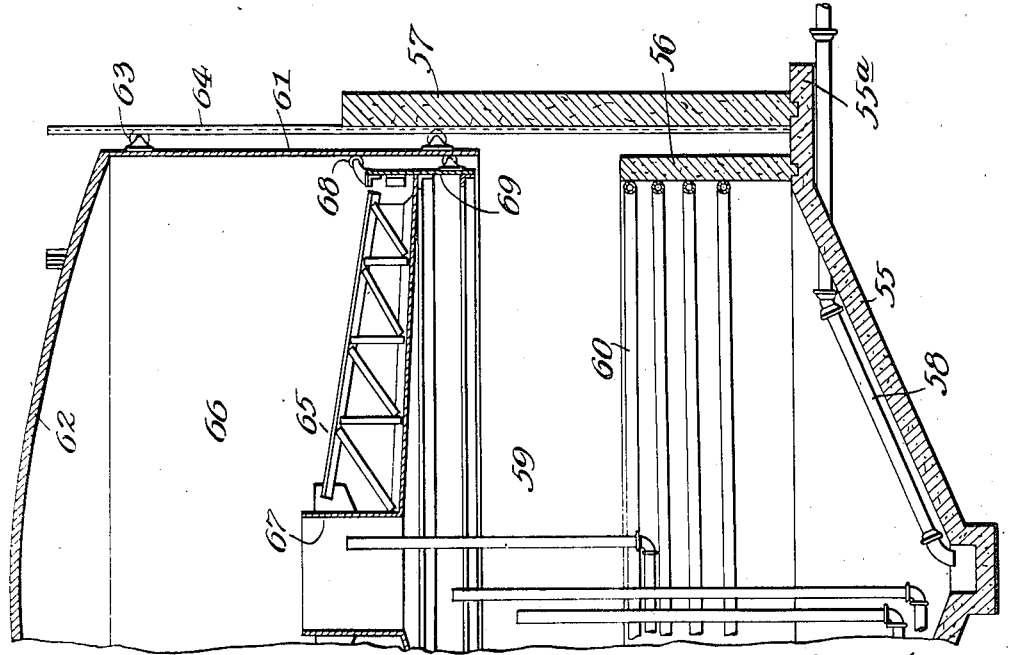

2,050,915

UNITED STATES PATENT OFFICE 2,050,915

COMBINATION SLUDGE DIGESTION AND GAS STORAGE TANK

Hubert Beddoes and Harry E. Schlenz, Chicago, Ill., assignors to Pacific Flush Tank Company, Chicago, Ill., a corporation of Illinois Application May 28, 1932, Serial No. 614,214

9 Claims. (Cl. 210—2)

This invention relates to combination sludge digestion and gas storage tanks and its purpose is to provide a new arrangement of apparatus whereby the gas generated in the digestion of sewage sludge may be conveyed directly to a gas storage tank constructed in combination therewith, thereby giving rise to numerous advantages including economy of construction and efficiency of operation. It is desirable to utilize the gas generated by the digestion of sewage sludge in a digestion tank for various utilities, such as the production of heat for power purposes, but it has heretofore been necessary to convey the gas from the digestion tank to a separate gas storage tank, such as those employed in the storage of coal and water gas, and this has resulted in a loss of pressure while at the same time requiring the construction of an expensive storage tank on a separate foundation, so that the saving effected by the utilization of the gas has often been largely offset by the cost of constructing and maintaining the storage tank.

The principal object of the present invention is to provide a new form of sludge digestion and gas storage tank combined in one structure on a single foundation with the utilization of common walls and other parts for the sludge digestion tank and the storage tank, so that the cost of construction and maintenance is greatly reduced as compared with the former practice, while the gas generated in the sludge digestion tank is conveyed directly to the storage space without loss of pressure. The invention may preferably be employed in a construction including the floating cover of the type described and claimed in the United States patent of John R. Downes, No. 1,717,100, dated June 11, 1929, in which case the floating cover for the digestion tank is interposed between the digestion space and the gas storage space, but the invention may also be employed in connection with sludge digestion tanks having fixed covers. A further object of the invention is to provide a sludge digestion tank in combination with a gas storage space having large capacity and having a lower wall which forms the top wall of the sludge digestion space. Still another object of the invention is to provide a sludge digestion tank in combination with a gas storage tank having a floating annular wall provided with a water seal which is heated, and prevented from freezing, by the heat imparted thereto from the sludge digestion tank. A further object of the invention is to provide a sludge digestion tank and a gas storage tank having a common foundation and common annular walls with a common wall extending between them and mounted in stationary position or in floating position on the sludge being digested. Other objects relate to various features of construction and arrangement which will appear more fully hereinafter.

The nature of the invention will be understood from the following specification taken with the accompanying drawings in which several embodiments are illustrated.

In the drawings,

Figure 1 shows an axial vertical section through a combination sludge digestion and gas storage tank embodying the features of the present invention;

Fig. 2 is a partial top plan view of the modified form of construction shown in Fig. 3;

Fig. 3 is a vertical axial section through a portion of a modified form of the invention in which the sludge digestion tank has an annular wall which is separate from the lower supporting wall of the gas storage tank;

Fig. 4 shows a partial axial vertical section through another form of the invention in which the lower limit of movement of the floating cover is determined by an annular wall which extends upwardly to the height of the heating coils of the tank;

Fig. 5 shows a partial axial vertical section through still another form of the invention in which the floating cover of the sludge digestion tank is combined with a movable cover for the gas tank, with a common annular wall forming a guide for both covers.

As illustrated in Fig. 1, the invention is embodied in a construction comprising an upright cylindrical wall 10, formed of concrete or the like, which is supported upon and united with a bottom wall 11, in the shape of an inverted cone, thus forming an inner space 12 which constitutes the sludge digestion tank. The bottom wall 11 may rest directly upon the earth or upon the masonry foundation constructed beneath it, and it serves to support the entire structure including the gas storage tank. The sludge is adapted to be introduced into the space 12 through an inlet pipe 13 by the operation of a pump, not illustrated, and is adapted to be heated within the tank by a heating coil 14 through which steam or hot water may be caused to circulate. This heating coil is mounted upon a frame 15 which is supported upon the bottom wall 11. The digested sludge is adapted to be pumped from the extreme lower part of the tank through a discharge pipe 16 which extends upwardly along the inclined bottom wall and leads outwardly through the lower part of the annular wall 10.

The liquid in the upper part of the space 12 from which the sludge has settled may be drawn off through pipes 17 controlled by valves 17ª. These pipes open at different heights so that the liquid may be controlled at different levels and the vertical portions thereof are located so that they will not interfere with the movement of the cover hereinafter described.

The gas which is generated by the digestion of the sludge is adapted to be stored in a storage space 18 located within a metallic annular wall 19, of cylindrical form, which is provided with a dome-shaped top wall 20. The cylindrical wall 19 is of lesser diameter than the wall 10 and is adapted to extend downwardly within the latter wall, the position of the wall 19 depending upon the pressure of the gas in the storage space 18. The wall 19 is provided at intervals around its periphery with brackets having rollers 21 which are adapted to travel within the channels of a number of channel-shaped guide members 22 which extend vertically from the bottom of the concrete wall 10 and terminate at their upper ends somewhat above the normal upper limits of the uppermost portion of the wall 19. When the wall 19 is in its lowermost position, it is adapted to rest upon a ledge 23 extending inwardly from the lower part of the wall 10.

The sludge digestion space 12 and the gas storage space 18 are separated from each other by a floating cover 25 which is adapted to rest upon the sludge in the space 12 and to change its position in response to changes in volume of the sludge. The floating cover 20 is provided at its center with a large tubular hub or conduit 26 through which the gas generated in the space 12 passes upwardly into the space 18. Extending outwardly from the central tube or dome 26, are a plurality of radial beams or trusses 27 which are attached to the member 26 at their inner ends and which are secured at their outer ends through plates 28 to an annular rim plate or skirt 29. Extending outwardly from the tube 26 is a ceiling plate 30, which is connected at its outer edge, to an annular angle plate 31, with the depending skirt 29. All of the parts of this cover plate 25 are preferably secured together by spot welding. The bottom edge of the rim plate or skirt 29 is adapted to engage an annular angle sealing bar 32 which is secured to the wall 19 to serve as a stop to limit the downward movement of the cover 25. The cover 25 is provided at intervals around its periphery with brackets carrying vertically aligned pairs of rollers 33 which are adapted to travel upon the inner surface of the wall 19 during the movement of the cover. The position of the floating cover 25 is therefore independent of the position of the wall 19 and top wall 20. When the quantity of gas stored in the space 18 is relatively small, the top wall 20 may occupy a position adjacent to the cover plate 25 and the position of the floating cover 25 depends, of course, upon the volume of sludge in the tank 10. The gas which is stored in the space 18 is adapted to be drawn off through a gas outlet pipe 34 which terminates in a vertical portion adapted to project through the tube 26 so that it communicates at all times with the tube 26 or with the storage space 18 about the cover 25.

In Figs. 2 and 3 in the drawings, there is illustrated a modified form of the invention in which the bottom wall 35, constructed generally in the form of an inverted cone, and supported by a suitable foundation, is provided with an outwardly extending rim 35a upon which are mounted an inner annular concrete wall 36 and an outer annular concrete wall 37 concentric therewith. The annular space 38 between these walls is adapted to receive a cylindrical metal shell or wall 39 having connection at its upper edge with a curved top wall 40. The annular wall 39 is provided at intervals with brackets upon which are mounted rollers 41 spaced apart vertically in pairs to coact with the grooves of the channel shaped guide members 42 which extend vertically from the bottom of the annular space 38 to a point above the outer edge of the top wall 40 in its uppermost position, being secured to the outer annular wall 37. This space between the walls 36 and 37 may be filled with water or the like to form a fluid seal for the wall 39 and thereby prevent the escape of gas. The space 43 within the annular wall 36 is adapted to contain the sewage sludge to be digested and the space 44 within the annular shell 39 is adapted to contain the gas which is produced by the process of digestion. These spaces 43 and 44 are separated by a floating cover 45 which rests upon the surface of the sludge. As in the preceding form, the floating cover 45 comprises a central dome or tube 46 through which the gas generated in the space 43 passes upwardly into the storage space 44. From the central tube or dome 46, a number of beams or trusses 47 extend outwardly to the annular skirt or rim 48. A metal plate 49 is secured to the undersides of the trusses 47 and forms an upwardly and inwardly tapered ceiling for the digestion tank. This plate 49 is secured at its outer edge to the rim or skirt 48 which extends downwardly beneath it to a considerable extent as shown in Fig. 3. The cover 45 carries a number of brackets which have rollers 50 mounted therein to coact with the inner surface of the concrete wall 36. The lower limit of movement of the floating cover 45 is determined by an annular shoulder 36a formed on the wall 36. Beneath this shoulder 36a, there are located heating coils 52 adapted to have steam or hot water circulated therethrough for heating the sludge within the tank and the heat of this coil also heats the water or other liquid contained within the annular space 38 so that the freezing thereof is prevented. A sludge outlet pipe 53 is shown communicating with the lowermost portion of the sludge digestion tank and the sludge is conveyed into this tank through another pipe, not illustrated, as in the first form of the invention described. A pipe 54 may be mounted to extend vertically through the tube 46 for conveying away the gas which is stored in the space 44, and additional pipes, similar to the pipes 17 of Fig. 1, may be employed for controlling the upper liquid level of the sludge.

In Fig. 4 of the drawings there is shown another modification in which the inner annular wall of the sludge digestion tank is terminated just above the heating coils. In this form, a bottom wall 55 of inverted cone shape is constructed of concrete or the like and supported upon a suitable base or foundation with its outer edge terminating in a horizontal flange 55a upon which is mounted an inner annular concrete wall 56 and an outer annular concrete wall 57. The lower part of the tank is provided with a sludge outlet pipe 58 and the sludge is conveyed into the tank by another pipe not illustrated. This sludge is contained within a space 59 surrounded by the annular wall 57 and is heated by a heating coil 60 located within the inner annular wall 56. An annular metal wall or shell 61 is mounted for movement within the upper portion of the wall 57 and is provided with a top wall 62 connected thereto around its outer edges. The wall 61 is provided with rollers 63 which are adapted to travel within the grooves of guide channels 64 which extend downwardly within the wall 57 and are secured thereto. Within the wall 61, there is mounted a floating cover 65 which separates the sludge digestion space 59 from the gas storage space 66. This cover 65 has a central tube or passage 67 through which the gas passes up from the sludge digestion space to the gas storage space. The cover 65 is constructed in all respects like the cover shown in Fig. 3 and has rollers 68 which travel upon the inner surface of the wall 61. The downward movement of this floating cover 65 is limited by the engagement of the annular rim or skirt 69 thereof with the upper edge of the wall 56. Inasmuch as the cover 65 rests upon the sludge within the space 59, which extends outwardly to the wall 57, it forms a seal between the lower part of the wall 61 and the wall 57 and also between the wall 61 and the skirt 69 of the floating cover so that the escape of gas is prevented. As in Fig. 1, pipes may be provided for drawing off the gas and controlling the level of the liquid above the settled sludge.

The form of the invention shown in Fig. 5 is similar to that shown in Fig. 6 except that the sludge digestion tank is provided with a floating cover instead of a stationary one. In this embodiment, the tank has a tapered bottom wall 100 upon which is supported an annular concrete wall 101 having located therein the heating coil 102. Upon the wall 101 there is mounted an annular sheet metal shell 103 and within this shell there are mounted a floating cover 104 for the sludge digestion tank 105 and also a floating diaphragm cover 106 for the gas storage space 107. The cover 104 is similar to the floating cover previously described and has a central opening 108 through which the gas passes upwardly into the storage space 107. This cover also has rollers 109 which travel on the inner surface of the wall 103. The diaphragm cover 106 is similar to the cover 96 and is provided with rollers 110 which travel on the wall 103 and also with an annular wiper 111 which engages that wall to form a gas-tight closure. Pipes for drawing off the gas and controlling the liquid level may be provided as in Fig. 1.

Although several forms of the invention have been shown and described by way of illustration, it will be understood that it may be constructed in various other embodiments coming within the scope of the appended claims.

We claim:

1. In combination, a sludge digestion tank having an annular wall, guiding means secured to said wall and extending upwardly therefrom, a gas dome mounted within said guiding means and a floating cover having means coacting with said gas dome on the inner side thereof.

2. The combination with a sludge digestion tank, of means in said tank for heating the contents thereof, a floating cover for said tank having an opening therethrough, and a floating dome above said cover for confining the gas passing through said opening, the position of said dome being dependent upon the quantity of gas therein.

3. The combination with a sludge digestion tank, of means in said tank for heating the contents thereof, a floating cover for said tank having an opening therethrough, means above said cover for confining the gas passing through said opening, and means extending through said tank into said opening for withdrawing gas from the space above said cover.

4. In combination, a sludge digestion tank having a bottom wall and a pair of concentric annular walls spaced apart and extending upwardly from said bottom wall, a metallic gas storage dome mounted above said tank and having an annular shell extending downwardly into the space between said annular walls, a cover within said inner annular wall adapted to rest upon the sludge in said tank, and heating means located within said inner annular wall.

5. In combination, a sludge digestion tank having a bottom wall provided with inner and outer annular walls extending upwardly therefrom with an annular space between them adapted to receive a water seal, a gas storage dome having a shell extending downwardly into said annular space and engaging said water seal, the elevation of said dome depending upon the quantity of gas generated in said sludge, a floating cover mounted to rest upon the sludge within said inner annular wall, and heating means located within said inner annular wall.

6. In combination, a bottom wall, an annular wall mounted on said bottom wall, a floating cover for the space within said annular wall, said cover having a central opening therethrough, a relatively movable gas dome mounted above said cover, means for conveying sludge to the space beneath said cover, means for heating said space, means for conveying digested sludge from said space, and means for conveying gas from the region above said cover.

7. In combination, a sewage sludge digestion tank, and a pair of relatively movable floating covers mounted within said tank and forming between them a gas storage space.

8. In combination, a bottom wall, an inner and an outer annular wall mounted on said bottom wall and having an annular space between them adapted to receive a water seal, a shell extending downwardly into said annular space and engaging said water seal, and a floating cover mounted within said inner annular wall.

9. In combination, a sludge digestion tank having an upwardly extending annular wall, a dome-shaped shell having an annular wall extending downwardly within the annular wall of said tank, and a floating cover for said sludge digestion tank movable within the annular wall of said shell.

HUBERT BEDDOES.
HARRY E. SCHLENZ.